US008743986B2

(12) United States Patent
Kim et al.

(10) Patent No.: US 8,743,986 B2
(45) Date of Patent: Jun. 3, 2014

(54) MULTI-CELL BASED METHOD FOR APPLYING MULTI-CELL MIMO

(75) Inventors: Su Nam Kim, Gyeonggi-do (KR); Jae Wan Kim, Gyeonggi-do (KR); Dong Guk Lim, Gyeonggi-do (KR); Bin Chul Ihm, Gyeonggi-do (KR); Ja Ho Koo, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 440 days.

(21) Appl. No.: 13/003,728

(22) PCT Filed: Jun. 18, 2009

(86) PCT No.: PCT/KR2009/003269
§ 371 (c)(1),
(2), (4) Date: Jan. 31, 2011

(87) PCT Pub. No.: WO2010/005184
PCT Pub. Date: Jan. 14, 2010

(65) Prior Publication Data
US 2011/0200132 A1    Aug. 18, 2011

Related U.S. Application Data

(60) Provisional application No. 61/079,813, filed on Jul. 11, 2008.

(30) Foreign Application Priority Data

Oct. 31, 2008  (KR) ......................... 10-2008-0107609

(51) Int. Cl.
H04B 7/02 (2006.01)
(52) U.S. Cl.
USPC ......................................... 375/267; 455/132

(58) Field of Classification Search
USPC ............................................................ 375/267
See application file for complete search history.

(56) References Cited

U.S. PATENT DOCUMENTS

| | | | | |
|---|---|---|---|---|
| 5,410,732 A | * | 4/1995 | Ames et al. | 455/422.1 |
| 6,665,521 B1 | | 12/2003 | Gorday et al. | |
| 7,058,367 B1 | * | 6/2006 | Luo et al. | 455/101 |
| 7,546,129 B2 | * | 6/2009 | Stein | 455/456.1 |
| 7,773,705 B2 | * | 8/2010 | Jung et al. | 375/347 |
| 8,005,128 B1 | * | 8/2011 | Lamba et al. | 375/144 |
| 8,284,652 B2 | * | 10/2012 | Jou et al. | 370/209 |
| 8,320,488 B2 | * | 11/2012 | Lee et al. | 375/267 |
| 2005/0255858 A1 | * | 11/2005 | Stein | 455/456.1 |

(Continued)

FOREIGN PATENT DOCUMENTS

KR  10-2006-0111238  10/2006
WO  WO 2006/063138  6/2006

Primary Examiner — Santiago Garcia
(74) Attorney, Agent, or Firm — Morgan, Lewis & Bockius LLP

(57) ABSTRACT

The present invention relates a method for transmitting and receiving data in a mobile communication system. More specifically, the invention relates to a method through which a terminal in a cell boundary receives data in a mobile communication system that supports MIMO (Multi Input Multi Output). The method comprises: a step for receiving a first data stream transmitted through multiple transmission antennas from a serving base station, a step for pre-coding a second data stream to make the time delay of the second data stream be different from that of the first data stream and receiving the second data stream from a collaborating base station, and a step for restoring the data based on the first and second data streams.

6 Claims, 2 Drawing Sheets

(56) References Cited

U.S. PATENT DOCUMENTS

| | | | |
|---|---|---|---|
| 2006/0013186 A1* | 1/2006 | Agrawal et al. | 370/344 |
| 2006/0239222 A1* | 10/2006 | Kim et al. | 370/328 |
| 2007/0184862 A1* | 8/2007 | Hartless | 455/503 |
| 2008/0125154 A1* | 5/2008 | Zirwas et al. | 455/501 |
| 2009/0034479 A1* | 2/2009 | Wakayama et al. | 370/332 |
| 2009/0304120 A1* | 12/2009 | Agrawal et al. | 375/340 |
| 2011/0064066 A1* | 3/2011 | Lamba et al. | 370/342 |
| 2011/0069742 A1* | 3/2011 | Narayan et al. | 375/148 |

* cited by examiner

MULTI-CELL BASED METHOD FOR APPLYING MULTI-CELL MIMO

The present application is a national stage of PCT International Application No. PCT/KR2009/003269, filed Jun. 18, 2009, and claims the benefit of U.S. Provisional Application No. 61/079,813, filed Jul. 11, 2008. The present national stage application also claims the benefit of Korean Patent Application No. 10-2008-0107609, filed Oct. 31, 2008.

TECHNICAL FIELD

The present invention relates to data transmission and reception of a mobile communication system, and more particularly, to a multi-cell based method of transmitting and receiving data using a Multiple Input Multiple Output (MIMO) scheme.

BACKGROUND ART

Recently, a Multiple Input Multiple Output (MIMO) system has been a focus of attention as broadband wireless mobile communication technology. The MIMO system can increase spectral efficiency in proportion to the number of antennas, compared with a conventional Single Input Single Output (SISO) system.

MIMO is multiple antenna technology which establishes high-rate communication using a plurality of transmission antennas and a plurality of reception antennas. The MIMO technology may be divided into a spatial multiplexing scheme and a spatial diversity scheme, depending on whether or not data transmitted through the antennas is the same.

The spatial multiplexing scheme refers to a scheme for simultaneously transmitting different data through several transmission antennas. A transmitter transmits different data through each transmission antenna and a receiver identifies several pieces of transmitted data through adequate interference removal and signal processing. Accordingly, data transfer rate can be improved in proportion to the number of transmission antennas.

The spatial diversity scheme refers to a scheme for transmitting the same data through several transmission antennas so as to obtain transmission diversity gain. The spatial diversity scheme is one of space-time channel coding schemes. The spatial diversity scheme does not increase transfer rate, but increases transmission reliability.

In addition, MIMO technology is divided into an open-loop scheme (e.g., BLAST, STTC, etc.) and a closed-loop scheme (e.g., TxAA, etc.), depending on whether feedback information of a channel status is transmitted from a receiver to a transmitter.

A collaborative MIMO system is proposed in order to reduce inter-cell interference in a multi-cell environment. If a collaborative MIMO system is used, a terminal may collaboratively receive data from a multi-cell base station. That is, communication performance of a terminal in a cell boundary can be improved using collaborative MIMO in a multi-cell environment. Research has been conducted into a method for transmitting and receiving data using collaborative MIMO. In particular, research has been conducted into a method for performing multi-cell MIMO while maintaining compatibility with a conventional single-cell MIMO system.

DISCLOSURE

Technical Problem

Accordingly, the present invention is directed to a multi-cell based method for applying multi-cell MIMO that substantially obviates one or more problems due to limitations and disadvantages of the related art.

An object of the present invention is to provide a multi-cell MIMO scheme for transmitting data with high reliability to a terminal in a cell boundary in a mobile communication system.

Another object of the present invention is to provide a method of obtaining diversity gain with respect to data streams transmitted from multiple cells using MIMO.

Another object of the present invention is to provide a multi-cell MIMO scheme which can be readily implemented based upon a conventional single-cell MIMO scheme and can support the single-cell MIMO scheme.

Technical Solution

To achieve these objects and other advantages and in accordance with the purpose of the invention, as embodied and broadly described herein, a method of receiving data at a terminal in a cell boundary in a mobile communication system which supports Multiple Input Multiple Output (MIMO) includes receiving a first data stream transmitted through multiple transmission antennas from a serving base station, receiving, from a collaborating base station, a second data stream, which is precoded to make at least one of time delay, antenna permutation and stream permutation of the second data stream different from that of the first data stream based on the same source data as the first data stream and is transmitted through multiple transmission antennas, and restoring the source data based on the first and second data streams.

In another aspect of the present invention, a method of transmitting data to a terminal in a cell boundary in a mobile communication system which supports Multiple Input Multiple Output (MIMO) includes transmitting a first data stream from a serving base station to the terminal through multiple transmission antennas, and transmitting a second data stream, which is precoded to make at least one of time delay, antenna permutation and stream permutation of the second data stream different from that of the first data stream based on the same source data as the first data stream, from a collaborating base station to the terminal through multiple transmission antennas.

It is to be understood that both the foregoing general description and the following detailed description of the present invention are exemplary and explanatory and are intended to provide further explanation of the invention as claimed.

Advantageous Effects

According to the embodiments of the present invention, the following effects are obtained.

First, it is possible to provide multi-cell MIMO in which data is transmitted with high reliability.

Second, it is possible to obtain diversity gain with respect to data streams transmitted from multiple cells using MIMO.

Third, it is possible to support single-cell MIMO and to provide multi-cell MIMO which is readily implemented based upon single-cell MIMO.

Additional objects and features of the invention will be set forth in part in the description which follows and in part will become apparent to those having ordinary skill in the art upon examination of the following or may be learned from practice of the invention.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

MODE FOR INVENTION

The configuration, operation and other features of the embodiments of the present invention will be described with reference to the accompanying drawings. The following embodiments are examples in which the technical features of the present invention are applied to a multi-cell mobile communication system which supports Multi Input Multi Output (MIMO).

Figure 1:
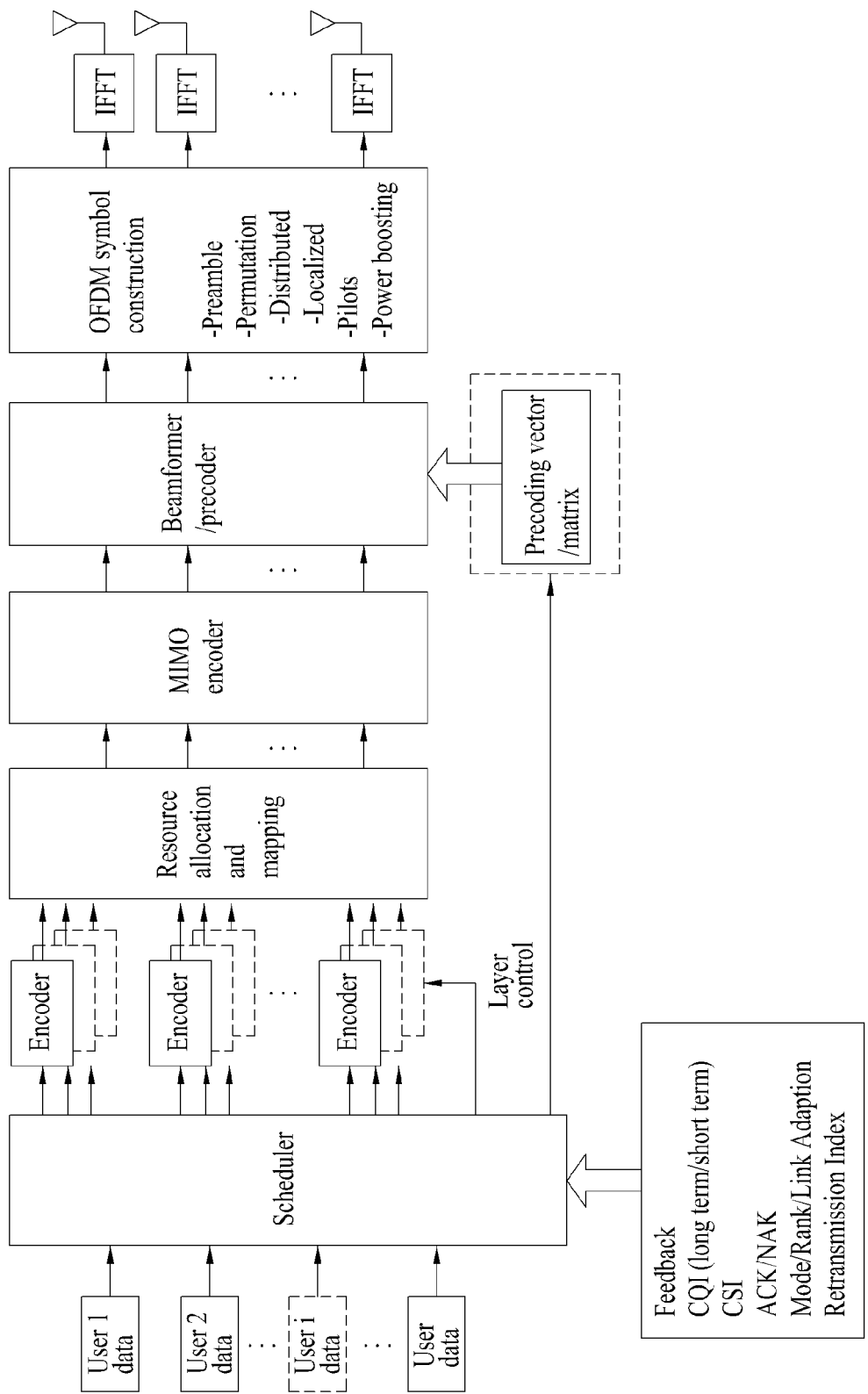
FIG. 1 is a block diagram showing an example of a transmission system used to operate downlink MIMO in a single cell.

FIG. 1 is a block diagram showing an example of a transmission system used to operate downlink MIMO in a single cell. The configuration of the transmission system will be briefly described and then precoding for single-cell MIMO will be described.

A feedback block provides feedback information such as Channel Quality Information (CQI) or Channel Status Information (CSI) from a base station to a scheduler block. The scheduler block schedules users to resource blocks in consideration of the feedback information and determines a Modulation & Coding Scheme (MCS), a MIMO parameter (MIMO mode or rank), etc. In single-user MIMO (SU-MIMO), one user is scheduled to a Resource Unit (RU). The RU is a resource allocation unit including a predetermined number of subcarriers and a predetermined number of OFDMA symbols. For example, the RU may include 18 subcarriers and six OFDMA symbols. In multi-user MIMO (MU-MIMO), multiple users may be scheduled to one RU.

Data received from a user is input to an encoder block after being scheduled. The encoder block includes a channel encoder, an interleaver, a rate-matcher and a modulator for input data, and performs channel coding, modulation, etc. with respect to the input data. Channel coding, for example, adds parity bits to system bits such that errors generated when data is transmitted through a channel are corrected. As a channel coding method, a convolution coding method, a turbo coding method or a Low Density Parity Check (LDPC) coding method may be used. The channel-coded binary data is mapped to symbols by a digital modulation scheme such as QPSK or QAM. Thereafter, a resource mapping block maps the modulated symbols to corresponding time-frequency resources of the allocated RU.

A MIMO encoder block maps L ($\geq$1) layers to $N_S$ ($\geq$L) streams. The $N_S$ streams are input to a beamformer/precoder block. In the present specification, the term "layer" refers to a coding/modulation path input to a MIMO encoder and the term "stream" refers to output of the MIMO encoder, which is input to a beamformer/precoder. In addition, the term "data stream" refers to an output transmitted through an antenna over an air interface after precoding. The MIMO encoder processes the data symbols using a previously negotiated method in order to increase system capacity, throughput and coverage in the case where data symbols are transmitted through a plurality of transmission antennas. A MIMO encoding method largely includes a Spatial Division Multiplexing (SDM) scheme, a Spatial Time Block Coding (STBC) scheme, a Spatial Frequency Block Coding (SFBC) scheme, etc. The SDM scheme refers to a scheme for enabling a transmitter to send independent data through each antenna so as to increase transmission rate. The STBC scheme refers to a scheme for performing coding at a symbol level through an antenna, that is, over a spatial region and a time region so as to obtain antenna diversity gain and coding gain, thereby improving link level performance. The SFBC scheme refers to a scheme for performing coding at a symbol level through an antenna, that is, over a spatial region and a frequency region so as to obtain antenna diversity gain and coding gain, thereby improving link level performance. A linear Dispersion Coding (LDC) scheme is a combination of an SDM scheme and an STBC scheme. The MIMO technology may be expressed by an LDC matrix used for multi-antenna encoding and decoding. Data symbols which will be transmitted through transmission antennas may be identified by MIMO encoding. For example, if the number of transmission antennas is four, modulated data symbol streams are multi-antenna-encoded by a MIMO encoder so as to output four data symbol streams. The MIMO mode includes an open-loop MIMO mode and a closed-loop MIMO mode, depending on whether or not feedback information from a base station is used. In general, the open-loop MIMO mode does not use feedback information, but the closed-loop MIMO mode uses feedback information.

The beamformer/precoder block generates antenna-specific data according to the selected MIMO mode so as to map the $N_S$ streams to a plurality of transmission antennas. The $N_S$ streams output from the beamformer/precoder block are input to an OFDM symbol construction block. In the OFDM symbol construction block, data is allocated to be distributed or localized by permutation. In addition, a preamble, etc. is constructed and a pilot for channel estimation, etc. is allocated. In addition, power boosting, etc. is performed with respect to a specific signal using feedback information from a terminal. The data signal output from the OFDM symbol construction block is changed to a time domain signal by an IFFT process and then is transmitted through transmission antennas over an air interface.

A base station uses at least two transmission antennas and a terminal uses at least one reception antenna. For example, the antenna configuration may be $(N_T, N_R)$=(2, 2), (4, 2), (4, 4), (8, 2) and (8, 4). $N_T$ denotes the number of transmission antennas of the base station and $N_R$ denotes the number of reception antennas of the terminal. In open-loop SU-MIMO, closed-loop SU-MIMO and MU-MIMO, resource mapping may be localized or distributed.

In open-loop MIMO, a spatial multiplexing scheme and a transmission diversity scheme may be used. Even in open-loop MIMO, the base station may use CQI and rank feedback to determine rank adaptation, transmission mode switching and rate adaptation. The CQI and the rank feedback may or may not depend on frequency.

In closed-loop MIMO, unitary codebook based precoding may be used in Time Division Duplex (TDD) and Frequency-Division Duplex (FDD). The CQI, Precoding Matrix Indicator (PMI) and rank feedback are transmitted from the terminal to be used to determine scheduling, resource allocation and rate adaptation of the base station. In the case of TDD, sounding based precoding may be supported.

Hereinafter, a process of an MIMO encoder block and a precoder block will be described in greater detail. The MIMO encoder performs a batch process of simultaneously processing M input symbols. An input of the MIMO encoder may be expressed by an M×1 vector as follows.

$$x = \begin{bmatrix} s_1 \\ s_2 \\ \vdots \\ s_M \end{bmatrix}$$

where, $s_i$ denotes an i-th input symbol. An output of the MIMO encoder is an $N_S \times N_F$ MIMO STC/SFC matrix $z=S(x)$ and is input to a precoder. An output of the precoder may be expressed by an $N_S \times N_F$ matrix as follows.

$$y = \begin{bmatrix} y_{1,1} & y_{1,2} & \cdots & y_{1,N_F} \\ y_{2,1} & y_{2,2} & \cdots & y_{2,N_F} \\ \vdots & \vdots & \ddots & \vdots \\ y_{N_T,1} & y_{N_T,2} & \cdots & y_{N_T,N_F} \end{bmatrix}$$

where, $y_{i,j}$ denotes an output symbol of a j-th subcarrier/symbol transmitted through an i-th physical antenna. $N_F$ denotes the number of subcarriers or symbols used to transmit an MIMO signal derived from an input vector x. For example, the output of the MIMO encoder according to the number of transmission antennas will be expressed by the following equation.

Matrix A

TD (Transmit Diversity)

$$2\ Tx\ A = \begin{bmatrix} S_i & -S_{i+1}^* \\ S_{i+1} & S_i^* \end{bmatrix} \quad 3\ Tx\ A_1 = \begin{bmatrix} \tilde{S}_1 & -\tilde{S}_2^* & 0 & 0 \\ \tilde{S}_2 & \tilde{S}_1^* & \tilde{S}_3 & -\tilde{S}_4^* \\ 0 & 0 & \tilde{S}_4 & \tilde{S}_3^* \end{bmatrix}$$

$$4\ Tx\ A = \begin{bmatrix} s_1 & -s_2^* & 0 & 0 \\ s_2 & s_1^* & 0 & 0 \\ 0 & 0 & s_3 & -s_4^* \\ 0 & 0 & s_4 & s_3^* \end{bmatrix}$$

Matrix B

Hybrid (TD + SM)

$$2\ Tx\ C = \frac{1}{\sqrt{1+r^2}}\begin{pmatrix} S_i + jr \cdot S_{i+3} & r \cdot S_{i+1} + S_{i+2} \\ S_{i+1} - r \cdot S_{i+2} & jr \cdot S_i + S_{i+3} \end{pmatrix}$$

$$3\ Tx\ B_1 = \begin{bmatrix} \sqrt{\frac{3}{4}} & 0 & 0 \\ 0 & \sqrt{\frac{3}{4}} & 0 \\ 0 & 0 & \sqrt{\frac{3}{2}} \end{bmatrix} \begin{bmatrix} \tilde{S}_1 & -\tilde{S}_2^* & \tilde{S}_5 & -\tilde{S}_6^* \\ \tilde{S}_2 & \tilde{S}_1^* & \tilde{S}_6 & \tilde{S}_5^* \\ \tilde{S}_7 & -\tilde{S}_8^* & \tilde{S}_3 & -\tilde{S}_4^* \end{bmatrix}$$

$$4\ Tx\ B = \begin{bmatrix} s_1 & -s_2^* & s_5 & -s_7^* \\ s_2 & s_1^* & s_6 & -s_8^* \\ s_3 & -s_4^* & s_7 & s_5^* \\ s_4 & s_3^* & s_8 & s_6^* \end{bmatrix}$$

Matrix C

SM (Spatial Multiplexing)

$$2\ Tx\ B = \begin{bmatrix} S_i \\ S_{i+1} \end{bmatrix} \quad 3\ Tx\ C = \begin{bmatrix} S_1 \\ S_2 \\ S_3 \end{bmatrix} \quad 4\ Tx\ C = \begin{bmatrix} s_1 \\ s_2 \\ s_3 \\ s_4 \end{bmatrix}$$

The precoder performs precoding with respect to the output of the MIMO encoder. With respect to predetermined frequency resource k, a precoding matrix P is defined by the following equation.

$$P(k) = D(k) \times W(k)$$

The precoding matrix P includes two matrices. A matrix W(k) denotes an $N_T \times N_S$ matrix, wherein $N_T$ denotes the number of transmission antennas and $N_S$ denotes the number of streams. The matrix W(k) denotes a matrix which is previously set for precoding. The matrix W(k) may be variously set in consideration of a wireless environment, the number of transmission antennas, etc. In one implementation, the matrix W(k) may be selected from the unitary codebook. For example, in the case where the number of transmission antennas is two, the codebook may be given as follows. Hereinafter, the W(k) matrix is referred to as a precoder matrix.

TABLE 1

| CODEBOOK INDEX | Codebook | |
|---|---|---|
| | NUMBER OF STREAMS | |
| | 1 | 2 |
| 0 | $\begin{bmatrix} 1 \\ 0 \end{bmatrix}$ | $\frac{1}{\sqrt{2}}\begin{bmatrix} 1 & 0 \\ 0 & 1 \end{bmatrix}$ |
| 1 | $\begin{bmatrix} 0 \\ 1 \end{bmatrix}$ | $\frac{1}{2}\begin{bmatrix} 1 & 1 \\ 1 & -1 \end{bmatrix}$ |
| 2 | $\frac{1}{\sqrt{2}}\begin{bmatrix} 1 \\ 1 \end{bmatrix}$ | $\frac{1}{2}\begin{bmatrix} 1 & 1 \\ j & -j \end{bmatrix}$ |
| 3 | $\frac{1}{\sqrt{2}}\begin{bmatrix} 1 \\ -1 \end{bmatrix}$ | — |
| 4 | $\frac{1}{\sqrt{2}}\begin{bmatrix} 1 \\ j \end{bmatrix}$ | — |
| 5 | $\frac{1}{\sqrt{2}}\begin{bmatrix} 1 \\ -j \end{bmatrix}$ | — |

The matrix D(k) is an $N_T \times N_T$ diagonal matrix for phase shift of streams between antennas and is expressed by the following equation.

$$D(k) = \begin{bmatrix} e^{j\theta_0 k} & 0 & \cdots & 0 \\ 0 & e^{j\theta_1 k} & \cdots & 0 \\ \vdots & \vdots & \ddots & \vdots \\ 0 & 0 & \cdots & e^{j\theta_{(N_T-1)}k} \end{bmatrix}$$

where, $N_T$ denotes the number of transmission antennas, k denotes a frequency resource index, and $\theta_i$ ($i=0, 1, \ldots, N_T-1$)

denotes phase shift of an i-th transmission antenna. For example, the matrix D(k) of a 4Tx base station is expressed by the following equation.

$$\begin{bmatrix} 1 & 0 & 0 & 0 \\ 0 & e^{-j2\pi i/4} & 0 & 0 \\ 0 & 0 & e^{-j4\pi i/4} & 0 \\ 0 & 0 & 0 & e^{-j6\pi i/4} \end{bmatrix}$$

The precoding matrix P(k) may be P(k)=W(k) by setting the value $\theta_i$ of the matrix D(k) to 0.

Hereinafter, application of MIMO in a single cell will be described.

If MIMO is used to obtain transmit diversity, in one implementation, the MIMO encoder may apply 2Tx STBC/SFBC so as to generate a 2×2 matrix and sequentially multiply the 2×2 matrix by a 2×2 precoder matrix and an $N_T \times N_T$ matrix for phase shift.

First, if it is assumed that 2Tx rate-1 STBC/SFBC is applied, the input of the MIMO encoder is a 2×1 vector that may be expressed by the following equation. Here, $s_1$ and $s_2$ denote symbol vectors.

$$x = \begin{bmatrix} s_1 \\ s_2 \end{bmatrix}$$

In this case, the output of the MIMO encoder is a 2×2 vector and is expressed by the following equation.

$$z = \begin{bmatrix} s_1 & -s_2^* \\ s_2 & s_1^* \end{bmatrix}$$

If precoding is not applied at 2Tx rate-1, y=z is obtained.

If MIMO is used in Spatial Multiplexing (SM), the following cases may be used according to the number of transmission antennas.

rate-2 spatial multiplexing mode: 2Tx, 4Tx, 8Tx
rate-3 spatial multiplexing mode: 4Tx, 8Tx
rate-4 spatial multiplexing mode: 4Tx, 8Tx In one implementation, if rate-2 spatial multiplexing is applied, the input of the MIMO encoder is a 2×1 vector and may be expressed by the following equation. Here, $s_1$ and $s_2$ denote symbol vectors.

$$x = \begin{bmatrix} s_1 \\ s_2 \end{bmatrix}$$

In this case, the output of the MIMO encoder is a 2×1 vector and becomes z=x. If precoding is not applied, the output of the precoder becomes y=z.

If the number of Tx antennas is increased to $N_T$ and the rate-2 is continuously used, precoding may be applied in order to further improve performance. In this case, the output of the precoder is an $N_T \times 1$ matrix and may be expressed by the following equation.

$$Y=Pz$$

where, P denotes a precoding matrix and is expressed by a W or DW matrix, D denotes an $N_T \times N_T$ diagonal matrix for phase shift of streams between antennas, and W denotes an $N_T \times 2$ matrix for precoding which is previously set.

If rate-3 spatial multiplexing is applied, the input of the MIMO encoder is a 3×1 vector that may be expressed by the following equation. Here, $s_1$ to $s_3$ denote symbol vectors.

$$X = \begin{bmatrix} s_1 \\ s_2 \\ s_3 \end{bmatrix}$$

The output of the MIMO encoder is a 3×1 vector and becomes z=x. The output of the precoder is an $N_T \times 1$ matrix that may be expressed by the following equation.

$$Y=Pz$$

where, P denotes a precoding matrix and is expressed by a W or DW matrix, D denotes an $N_T \times N_T$ diagonal matrix for phase shift of streams between antennas, and W denotes an $N_T \times 3$ matrix for precoding which is previously set.

If rate-4 spatial multiplexing is applied, the input of the MIMO encoder is a 4×1 vector that may be expressed by the following equation. Here, $s_1$ to $s_4$ denote symbol vectors.

$$X = \begin{bmatrix} s_1 \\ s_2 \\ s_3 \\ s_4 \end{bmatrix}$$

The output of the MIMO encoder is a 4×1 vector and becomes z=x. The output of the precoder is an $N_T \times 1$ matrix that may be expressed by the following equation.

$$Y=Pz$$

where, P denotes a precoding matrix and is expressed by a W or DW matrix, D denotes an $N_T \times N_T$ diagonal matrix for phase shift of streams between antennas, and W denotes an $N_T \times 4$ matrix for precoding which is previously set.

Extension from Single-Cell MIMO to Multi-Cell MIMO

A serving base station (BS) and one or more neighboring BSs (or collaborating BSs) transmit the same data to a terminal in a cell boundary and the terminal couples data received from several base stations so as to increase data reliability. An example in which the terminal in the cell boundary may transmit and receive data to or from a plurality of BSs according to one embodiment of the present invention is shown in FIG. 2.

Figure 2:
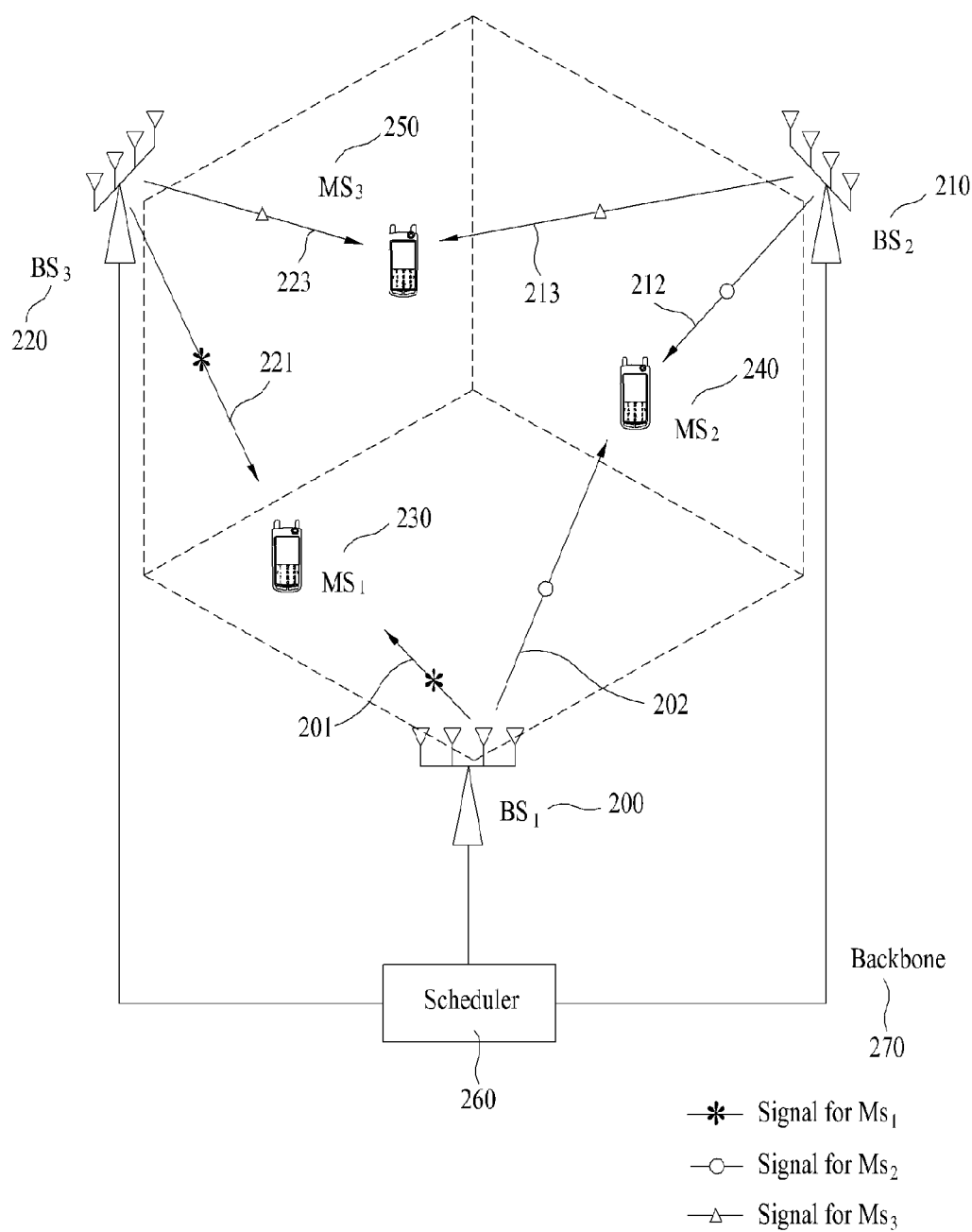
FIG. 2 is a diagram showing an example in which a terminal in a boundary between multiple cells transmits and receives data to or from a plurality of base stations according to an embodiment of the present invention.

Referring to FIG. 2, there are three adjacent cells and the three cells are serviced by a $BS_1$ 200, a $BS_2$ 210 and a $BS_3$ 220. In FIG. 2, each of the BSs has four antennas. The BSs are connected through a backbone network 270 and data communication is controlled by a scheduler 260 of the network. In FIG. 2, three terminals (mobile stations (MSs)), that is, an $MS_1$ 230, an $MS_1$ 240 and an $MS_1$ 250, are located in a cell boundary and are serviced by the $BS_1$ 200, the $BS_2$ 210 and the $BS_3$ 220. In FIG. 2, each of the MSs has two reception antennas. Each MS in the cell boundary may simultaneously receive a service from the serving BS and the collaborating BSs through multi-cell MIMO. The serving BS of the $MS_1$ 230 is the $BS_1$ 200 and the collaborating BS for multi-cell MIMO thereof is the $BS_3$ 220. Similarly, the serving BSs of the $MS_2$ 240 and the $MS_3$ 250 are respectively the $BS_2$ 210 and the $BS_3$ 220 and the collaborating BSs thereof are respectively the $BS_1$ 200 and the $BS_2$ 210. In FIG. 2, the $MS_1$ 230 simultaneously receives a service from the $BS_1$ 200 and the $BS_3$ 220 (201 and 221). In addition, the $MS_2$ 240 simultaneously receives a service from the $BS_1$ 200 and the $BS_2$ 210 (202 and 212). In addition, the $MS_3$ 250 simultaneously receives a service from the $BS_2$ 210 and the $BS_3$ 220 (213 and 223).

Extension from single-cell MIMO to multi-cell MIMO according to one embodiment of the present invention may be performed by enabling several BSs to perform precoding based on the same data and further applying at least one of the following conditions to precoding of single-cell MIMO. Before precoding, the data may be encoded by the same MIMO encoder in several BSs.

"Time delay" for a data stream is differently set according to BSs.

"Antenna permutation" for a data stream is differently set according to BSs.

"Stream permutation" for a data stream is differently set according to BSs.

In consideration of channel environments and system implementation, only any one of "time delay", "antenna permutation" and "stream permutation" for the data stream according to BSs may be applied or a combination thereof may be applied. Preferably, the time delays for data streams transmitted from several BSs may be differently set according to BSs. In this case, at least one of antenna permutation and stream permutation for the data streams may be additionally applied according to BSs.

The "time delay" enables the MS in the cell boundary to receive data streams transmitted from the serving BS and the collaborating BS at different times. The MS in the cell boundary receives the data streams from several BSs at different times so as to obtain diversity gain. Accordingly, the "time delay" may be freely set within a range which guarantees diversity gain. Since the performance of multi-cell MIMO may be influenced by a difference between the time delays of the serving BS and the collaborating BS rather than the time delays of the serving BS and the collaborating BS, the "time delay" of a certain BS may be "0". The "time delay" may be implemented by an $N_T \times N_T$ delay matrix having a format similar to that of a diagonal matrix used for phase shift between streams transmitted from antennas in single-cell MIMO. As described above, in the delay matrix, the time delay for the data stream is differently set according to BSs such that the MS in the cell boundary obtains diversity gain.

The "time delay" may be indicated or previously set by a Radio Network Controller (RNC) of a network. For example, each BS may calculate the "time delay" using a unique parameter of the BS. The unique parameter of the BS may be a BS identifier used to identify each BS. The "time delay" may be changed in order to obtain optimal MS performance even during the multi-cell MIMO operation. For example, the "time delay" may be controlled using feedback information from the MS. In detail, the MS may estimate a value for the "time delay" and feed back the value to the BS. In addition, if the MS transmits information about a channel status/reception signal (e.g., CQI, CSI, ACK/NAK, etc.), the serving BS may increase or decrease the "time delay" using the information. In addition, the serving BS may transmit the feedback information to, for example, the RNC of the network, and the RNC of the network may newly indicate the time delays of the serving BS and the collaborating BS in consideration of several BSs which perform multi-cell MIMO.

The "antenna permutation" indicates that, in a process of transmitting a plurality of streams output from the precoder through a plurality of transmission antennas, correspondence between the streams and the transmission antennas is changed. Similarly, the "stream permutation" indicates that the path of the output of the MIMO encoder input to the precoder is changed. The "antenna permutation" and the "stream permutation" may be performed by $N_T \times N_T$ and $N_S \times N_S$ matrices which are set to change the antenna or the path to the precoder. $N_T$ denotes the number of transmission antennas and $N_S$ denotes the number of streams. The matrices may be appropriately selected according to the purpose of permutation. For example, the matrices may be a set of unitary matrices in which only one element of each column has a value of 1 and the remaining elements thereof have values of 0. The BS and the MS may select only a part of the unitary matrices. In addition, indexes for the matrices may be used. The stream permutation may be extended through cyclic selection of a codebook used by the BS. For example, if the W matrix used by each BS is selected and used in Table 1 (stream 2), each BS may change a codebook in a specific period $T_W$, further apply permutation for changing the input path of the precoder using the changed codebook, and extend the stream permutation.

Information (e.g., a matrix index for permutation, a permutation mode, etc.) about the "antenna permutation" and/or "stream permutation" may be indicated by the RNC of the network or be previously set. In addition, the information may be controlled using the feedback information from the MS. For example, if the MS transmits information (e.g., CQI, CSI, ACK/NAK, etc.) about the channel status/reception signal, the serving BS may change information about "antenna permutation" and/or "stream permutation" using the information. In addition, the serving BS may transmit, for example, the information to the RNC of the network, and the RNC of the network may newly indicate "antenna permutation" and/or "stream permutation" of the serving BS and the collaborating BS in consideration of several BSs which perform multi-cell MIMO. The BS and the MS which perform multi-cell MIMO need to share information about the "antenna permutation" and/or the "stream permutation". Accordingly, if the setting and/or change of the information are performed, the BS and the MS may signal the information.

First Embodiment

The serving BS and the collaborating BS process data using the same MIMO encoder and then perform precoding with respect to streams output from the MIMO encoder. In the above process, the BSs changes the format of the D and W matrices used for precoding.

Assuming that the serving BS uses $D_S$ and $W_S$ and the collaborating BS uses $D_C$ and $W_C$, the precoder outputs $y_S$ and $y_C$ of the serving BS and the collaborating BS are expressed by the following equations, respectively.

$$y_S = D_S \times W_S \times z$$

$$y_C = D_C \times W_C \times z$$

where, D denotes an $N_T \times N_T$ diagonal matrix for differently setting the time delay according to BSs, W denotes an $N_T \times N_S$ precoder matrix, z denotes a stream vector to be precoded, a subscript s denotes a serving BS, a subscript c denotes a collaborating BS, $N_T$ denotes the number of transmission antennas, and $N_S$ denotes the number of streams.

That is, a signal output from each BS in multi-cell MIMO is as follows.

$$Y = \begin{bmatrix} y_s \\ y_c \\ \vdots \end{bmatrix} = \begin{bmatrix} D_s W_s \\ D_c W_c \\ \vdots \end{bmatrix} z$$

where, $D_S = D'_S \times D_{OS}$, $D_C = D'_C \times D_{OC}$, $W_S = W_{OS} \times L_S$, and $W_C = W_{OC} \times L_C$. Here, $D_{OS}$ and $D_{OC}$ denote $N_T \times N_T$ diagonal matrices applied for phase shift between streams on an antenna basis upon the single-cell MIMO operation, and $W_{OS}$ and $W_{OC}$ denote $N_T \times N_S$ precoder matrices applied upon the single-cell MIMO operation. $D_{OS}$ and $D_{OC}$ may be the same or different according to MIMO mode. $W_{OS}$ and $W_{OC}$ may be the same or different according to MIMO mode.

$D'_S$ and $D'_C$ denote delay matrices applied to the serving BS and the collaborating BS to obtain additional gain when applying multi-cell MIMO and are $N_T \times N_T$ diagonal matrices. The delay matrix is newly applied to multi-cell MIMO in order to differently set the "time delay" for the data stream according to BSs and has a format similar to that of $D_{OS}$ and $D_{OC}$ in single-cell MIMO.

$L_S$ and $L_C$ denote $N_S \times N_S$ matrices for "stream permutation" when applying multi-cell MIMO. Hereinafter, a method of generating the L matrix will be described. If the number of streams is $N_S$, first $2^{NS}$ column vectors are generated. For example, assuming that two BSs use two streams, the column vectors may be generated as follows.

$$\text{column vector set} = \left\{ \begin{bmatrix} 0 \\ 0 \end{bmatrix}, \begin{bmatrix} 0 \\ 1 \end{bmatrix}, \begin{bmatrix} 1 \\ 0 \end{bmatrix}, \begin{bmatrix} 1 \\ 1 \end{bmatrix} \right\}$$

L matrices are generated from any combination of $N_S$ elements of the column vector set. For example, the L matrix may be expressed by the following equation.

$$L = \left\{ \begin{bmatrix} 1 & 0 \\ 0 & 1 \end{bmatrix}, \begin{bmatrix} 0 & 1 \\ 1 & 0 \end{bmatrix}, \begin{bmatrix} 1 & 1 \\ 1 & 0 \end{bmatrix} \cdots \right\}$$

In actual use, only a certain sub set of these sets needs to be used. For example, in the case of $$L_{subset} = \left\{ \begin{bmatrix} 1 & 0 \\ 0 & 1 \end{bmatrix}, \begin{bmatrix} 0 & 1 \\ 1 & 0 \end{bmatrix} \right\},$$

the order of streams actually precoded by "stream permutation" is limited to (stream 1, stream 2) and (stream 2, stream 1). If two BSs operate in multi-cell MIMO, the following combinations are possible.

[BS1 (stream 1, stream 2), BS2 (stream 1, stream 2)]
[BS1 (stream 1, stream 2), BS2 (stream 2, stream 1)]
[BS1 (stream 2, stream 1), BS2 (stream 1, stream 2)]
[BS1 (stream 2, stream 1), BS2 (stream 2, stream 1)]

As another method, $W_S = S_S \times W_{OS}$ and $W_C = S_C \times W_{OC}$. $S_S$ and $S_C$ denote $N_T \times N_T$ matrices used for antenna selection used for data stream transmission of each BS, a combination thereof or antenna permutation.

Hereinafter, generation of an S matrix will be described. If it is assumed that the number of transmission antennas is n, $2^n$ column vectors are generated. For example, if it is assumed that two BS use two transmission antennas, the column vector is generated as follows.

$$\text{column vector set} = \left\{ \begin{bmatrix} 0 \\ 0 \end{bmatrix}, \begin{bmatrix} 0 \\ 1 \end{bmatrix}, \begin{bmatrix} 1 \\ 0 \end{bmatrix}, \begin{bmatrix} 1 \\ 1 \end{bmatrix} \right\}$$

S matrices are generated from any combination of n elements of the column vector set. For example, the S matrix may be expressed by the following equation.

$$S = \left\{ \begin{bmatrix} 1 & 0 \\ 0 & 1 \end{bmatrix}, \begin{bmatrix} 0 & 1 \\ 1 & 0 \end{bmatrix}, \begin{bmatrix} 1 & 1 \\ 1 & 0 \end{bmatrix} \cdots \right\}$$

In actual use, only a certain sub set of these sets may be used. For example, in the case of $$S_{subset} = \left\{ \begin{bmatrix} 1 & 0 \\ 0 & 1 \end{bmatrix}, \begin{bmatrix} 0 & 1 \\ 1 & 0 \end{bmatrix} \right\},$$

the method of associating the two outputs generated by precoding of the BSs with respective transmission antennas is limited to (antenna 1, antenna 2) or (antenna 2, antenna 1). If two BSs operate in multi-cell MIMO, the following combinations are possible.

[BS1 (antenna 1, antenna 2), BS2 (antenna 1, antenna 2)]
[BS1 (antenna 1, antenna 2), BS2 (antenna 2, antenna 1)]
[BS1 (antenna 2, antenna 1), BS2 (antenna 1, antenna 2)]
[BS1 (antenna 2, antenna 1), BS2 (antenna 2, antenna 1)]

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claim referring to the other claims other than the specific claims to constitute the embodiment or add new claims by means of amendment after the application is filed.

The embodiments of the present invention have been described based the data transmission and reception between a base station and a terminal. A specific operation which has been described as being performed by the base station may be performed by an upper node of the base station. In other words, it will be apparent that various operations performed for communication with the user equipment in the network which includes a plurality of network nodes along with the base station can be performed by the base station or network nodes other than the base station. The term "base station" may be replaced with terms such as fixed station, Node B, eNode B (eNB), and access point. Also, the term "terminal" may be replaced with terms such as user equipment (UE), mobile station (MS) and mobile subscriber station (MSS).

The embodiments according to the present invention can be implemented by various means, for example, hardware, firmware, software, or a combination thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented through a module, a procedure, or a function, which perform functions or operations described as above. Software code may be stored in a memory unit and then executed by a processor. The memory unit may be located inside or outside the processor to transmit and receive data to and from the processor through various well known means.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The present invention is applicable to data transmission and reception of a mobile communication system and, more particularly, to a method of transmitting and receiving data using multi-cell based MIMO technology.

What is claimed is:

1. A method of receiving data at a terminal in a cell boundary in a mobile communication system which supports Multi Input Multi Output (MIMO), comprising:
    receiving a first data stream transmitted through multiple transmission antennas from a serving base station;
    receiving, from a collaborating base station, a second data stream, which is precoded to make at least one of time delay, antenna permutation and stream permutation of the second data stream different from that of the first data stream based on the same source data as the first data stream and is transmitted through multiple transmission antennas; and
    decoding the first and second data streams,
    wherein the first data stream and the second data stream are precoded using first and second diagonal matrices for differently setting the time delay according to base stations,
    wherein the first data stream and the second data stream are respectively precoded by Equations 1 and 2:

$$y_S = D_S \times W_S \times z \quad \text{Equation 1}$$

$$y_C = D_C \times W_C \times z \quad \text{Equation 2}$$

where, $y_S$ denotes a precoded data stream of the serving base station, $y_C$ denotes a precoded data stream of the collaborating base station, $D_S$ denotes an $N_T \times N_T$ diagonal matrix of the serving base station, $D_C$ denotes an $N_T \times N_T$ diagonal matrix of the collaborating base station for differently setting the time delay from the first data stream, $W_s$ denotes an $N_T \times N_S$ precoder matrix of the serving base station, $W_C$ denotes an $N_T \times N_S$ precoder matrix of the collaborating base station, z denotes a stream vector to be precoded, $N_T$ denotes the number of transmission antennas, and $N_S$ denotes a number count of the first and second streams, and wherein $D_S$ and $D_C$ are respectively determined by Equations 3 and 4:

$$D_S = D'_S \times D_{OS} \quad \text{Equation 3}$$

$$D_C = D'_C \times D_{OC} \quad \text{Equation 4}$$

where $D_{OS}$ and $D_{OC}$ denote $N_T \times N_T$ diagonal matrices for generating phase shift between data streams through a plurality of transmission antennas in single-cell MIMO, and $D'_S$ and $D'_C$ denote $N_T \times N_T$ delay diagonal matrices further applied for differently setting the time delay according to base stations.

2. A method of receiving data at a terminal in a cell boundary in a mobile communication system which supports Multi Input Multi Output (MIMO), comprising:
    receiving a first data stream transmitted through multiple transmission antennas from a serving base station;
    receiving, from a collaborating base station, a second data stream, which is precoded to make at least one of time delay, antenna permutation and stream permutation of the second data stream different from that of the first data stream based on the same source data as the first data stream and is transmitted through multiple transmission antennas; and
    decoding the first and second data streams,
    wherein the first data stream and the second data stream are respectively precoded by Equations 5 and 6:

$$y_S = W_{OS} \times L_S z \quad \text{Equation 5}$$

$$y_C = W_{OC} \times L_C \times z \quad \text{Equation 6}$$

where, $y_S$ denotes a precoded data stream of the serving base station, $y_C$ denotes a precoded data stream of the collaborating base station, $W_{OS}$ denotes an $N_T \times N_S$ precoder matrix applied to single-cell MIMO of the serving base station, $W_{OC}$ denotes an $N_T \times N_S$ precoder matrix applied to single-cell MIMO of the collaborating base station, $L_S$ denotes an $N_S \times N_S$ matrix applied for stream permutation of the serving base station, $L_c$ denotes an $N_S \times N_S$ matrix applied for stream permutation of the collaborating base station, z denotes a stream vector to be precoded, $N_T$ denotes the number of transmission antennas, and $N_S$ denotes a number count of the first and second streams.

3. A method of receiving data at a terminal in a cell boundary in a mobile communication system which supports Multi Input Multi Output (MIMO), comprising:
    receiving a first data stream transmitted through multiple transmission antennas from a serving base station;
    receiving, from a collaborating base station, a second data stream, which is precoded to make at least one of time delay, antenna permutation and stream permutation of the second data stream different from that of the first data stream based on the same source data as the first data stream and is transmitted through multiple transmission antennas; and
    decoding the first and second data streams,
    wherein the first data stream and the second data stream are respectively precoded by Equations 7 and 8:

$$y_S = S_S \times W_{OS} \times z \quad \text{Equation 7}$$

$$y_C = S_C \times W_{OC} \times z \quad \text{Equation 8}$$

where, $y_S$ denotes a precoded data stream of the serving base station, $y_C$ denotes a precoded data stream of the collaborating base station, $W_{OS}$ denotes an $N_T \times N_S$ precoder matrix applied to single-cell MIMO of the serving base station, $W_{OC}$ denotes an $N_T \times N_S$ precoder matrix applied to single-cell MIMO of the collaborating base station, $S_S$ denotes an $N_T \times N_T$ matrix applied for antenna permutation of the serving base station, $S_C$ denotes an $N_T \times N_T$ matrix applied for antenna permutation of the collaborating base station, z denotes a stream vector to be precoded, $N_T$ denotes the number of transmission antennas, and $N_S$ denotes a number count of the first and second streams.

4. A method of transmitting data to a terminal in a cell boundary in a mobile communication system which supports Multiple Input Multiple Output (MIMO), comprising:

transmitting a first data stream from a serving base station to the terminal through multiple transmission antennas; and transmitting a second data stream, which is precoded to make at least one of time delay, antenna permutation and stream permutation of the second data stream different from that of the first data stream based on the same source data as the first data stream, from a collaborating base station to the terminal through multiple transmission antennas, wherein the first data stream and the second data stream are precoded using first and second diagonal matrices for differently setting the time delay according to base stations, and wherein the first data stream and the second data stream are respectively precoded by Equations 1 and 2:

$$y_S = D_S \times W_S \times z \qquad \text{Equation 1}$$

$$y_C = D_C \times W_C \times z \qquad \text{Equation 2}$$

where, $y_S$ denotes a precoded data stream of the serving base station, $y_C$ denotes a precoded data stream of the collaborating base station, $D_S$ denotes an $N_T \times N_T$ diagonal matrix of the serving base station, $D_C$ denotes an $N_T \times N_T$ diagonal matrix of the collaborating base station for differently setting the time delay from the first data stream, $W_S$ denotes an $N_T \times N_S$ precoder matrix of the serving base station, $W_C$ denotes an $N_T \times N_S$ precoder matrix of the collaborating base station, z denotes a stream vector to be precoded, $N_T$ denotes the number of transmission antennas, and $N_S$ denotes a number count of the first and second streams, and wherein $D_S$ and $D_C$ are respectively determined by Equations 3 and 4:

$$D_S = D'_S \times D_{OS} \qquad \text{Equation 3}$$

$$D_C = D'_C \times D_{OC} \qquad \text{Equation 4}$$

where $D_{OS}$ and $D_{OC}$ denote $N_T \times N_T$ diagonal matrices for generating phase shift between data streams through a plurality of transmission antennas in single-cell MIMO, and $D'_S$ and $D'_C$ denote $N_T \times N_T$ delay diagonal matrices further applied for differently setting the time delay according to base stations.

5. A method of transmitting data to a terminal in a cell boundary in a mobile communication system which supports Multiple Input Multiple Output (MIMO), comprising:

transmitting a first data stream from a serving base station to the terminal through multiple transmission antennas; and transmitting a second data stream, which is precoded to make at least one of time delay, antenna permutation and stream permutation of the second data stream different from that of the first data stream based on the same source data as the first data stream, from a collaborating base station to the terminal through multiple transmission antennas, wherein the first data stream and the second data stream are respectively precoded by Equations 5 and 6:

$$y_S = W_{OS} \times L_S \times z \qquad \text{Equation 5}$$

$$y_C = W_{OC} \times L_C \times z \qquad \text{Equation 6}$$

where, $y_S$ denotes a precoded data stream of the serving base station, $y_C$ denotes a precoded data stream of the collaborating base station, $W_{OS}$ denotes an $N_T \times N_S$ precoder matrix applied to single-cell MIMO of the serving base station, $W_{OC}$ denotes an $N_T \times N_S$ precoder matrix applied to single-cell MIMO of the collaborating base station, $L_S$ denotes an $N_S \times N_S$ matrix applied for stream permutation of the serving base station, $L_C$ denotes an $N_S \times N_S$ matrix applied for stream permutation of the collaborating base station, z denotes a stream vector to be precoded, $N_T$ denotes the number of transmission antennas, and $N_S$ denotes a number count of the first and second streams.

6. A method of transmitting data to a terminal in a cell boundary in a mobile communication system which supports Multiple Input Multiple Output (MIMO), comprising:

transmitting a first data stream from a serving base station to the terminal through multiple transmission antennas; and transmitting a second data stream, which is precoded to make at least one of time delay, antenna permutation and stream permutation of the second data stream different from that of the first data stream based on the same source data as the first data stream, from a collaborating base station to the terminal through multiple transmission antennas, wherein the first data stream and the second data stream are respectively precoded by Equations 7 and 8:

$$y_S = S_S \times W_{OS} \times z \qquad \text{Equation 7}$$

$$y_C = S_C \times W_{OC} \times z \qquad \text{Equation 8}$$

where, $y_S$ denotes a precoded data stream of the serving base station, $y_C$ denotes a precoded data stream of the collaborating base station, $W_{OS}$ denotes an $N_T \times N_S$ precoder matrix applied to single-cell MIMO of the serving base station, $W_{OC}$ denotes an $N_T \times N_S$ precoder matrix applied to single-cell MIMO of the collaborating base station, $S_S$ denotes an $N_T \times N_T$ matrix applied for antenna permutation of the serving base station, $S_C$ denotes an $N_T \times N_T$ matrix applied for antenna permutation of the collaborating base station, z denotes a stream vector to be precoded, $N_T$ denotes the number of transmission antennas, and $N_S$ denotes a number count of the first and second streams.

* * * * *